United States Patent [19]

Bradshaw et al.

[11] Patent Number: 5,528,518
[45] Date of Patent: Jun. 18, 1996

[54] SYSTEM AND METHOD FOR COLLECTING DATA USED TO FORM A GEOGRAPHIC INFORMATION SYSTEM DATABASE

[75] Inventors: Mark Bradshaw, San Francisco, Calif.;
Blair J. Zykan, Englewood, Colo.;
David Williams, Littleton, Colo.;
Jeremy Dunne, Littleton, Colo.;
Arnold B. Clarke, Littleton, Colo.

[73] Assignee: Laser Technology, Inc., Englewood, Colo.

[21] Appl. No.: 329,085

[22] Filed: Oct. 25, 1994

[51] Int. Cl.⁶ ................................................ G01B 7/14
[52] U.S. Cl. ........................ 364/561; 364/449; 364/560
[58] Field of Search .................................. 364/560, 561, 364/449, 444, 457, 459, 460; 342/357, 457, 118, 46, 54; 340/988–996; 455/12.1

[56] References Cited

U.S. PATENT DOCUMENTS

| | | | |
|---|---|---|---|
| 4,949,089 | 8/1990 | Ruszhowski, Jr. | 342/357 |
| 5,056,106 | 10/1991 | Wang et al. | 364/460 |
| 5,214,757 | 5/1993 | Mauney et al. | 395/161 |
| 5,381,338 | 1/1995 | Wysocki et al. | 364/449 |
| 5,420,594 | 5/1995 | FitzGerald et al. | 342/357 |
| 5,434,789 | 7/1995 | Fraher et al. | 364/561 |

OTHER PUBLICATIONS

SAFCO Corporation Advertisement "Walkabout PCS", pp. 1–4, copyright 1993.

Primary Examiner—Emanuel T. Voeltz
Assistant Examiner—Hal D. Wachsman
Attorney, Agent, or Firm—Robert H. Kelly; William J. Kubida; Holland & Hart

[57] ABSTRACT

A portable data acquisition device, including a position-determining device and data collector, determines and stores positional data associated with objects positioned in a geographical area within sight of the device. Data representative of attributes associated with the objects are also stored in the device. The data stored in the device can be transferred to processing circuitry of a computer and absolute positional coordinates of the objects are determined. The absolute positional coordinates and the data representative of the attributes associated with the objects are placed in files accessible by geographic information system (GIS) software which utilizes the data to form a geographic information system (GIS) database from which GIS maps may be formed.

14 Claims, 5 Drawing Sheets

SYSTEM AND METHOD FOR COLLECTING DATA USED TO FORM A GEOGRAPHIC INFORMATION SYSTEM DATABASE

The present invention relates generally to the collection of data to be used to form a geographic information system (GIS) database. More particularly, the present invention relates to a system and method for determining positional data of an object and for storing the positional data and data representative of attributes associated with the object, all without requiring that any equipment be positioned directly proximate to the selected object. The system and method of the present invention processes the data to generate visual displays and to place the data in a form which may be utilized by GIS software to form a GIS database.

BACKGROUND OF THE INVENTION

A geographic information system (GIS) database contains data associated with selected objects positioned within a geographic area. Data contained in the GIS database typically includes absolute or relative positional data associated with the selected objects as well as data representative of various attributes of the objects themselves. Data forming a GIS database can be quickly accessed and manipulated as desired. Data which forms a GIS database must first be collected, stored and then converted by GIS software into a GIS database. Both the geographic positions of the selected objects and the attributes of the objects must be collected and stored. Several different techniques may be used to collect the data.

With respect to the collection of the data, conventional surveying techniques may be utilized obtain the positional data associated with the objects. Some conventional surveying techniques utilize a manual theodolite; other conventional surveying techniques utilize a total station. By its very nature, conventional surveying techniques generally require two persons to work together to obtain the requisite positional data. Technical surveying expertise is required to obtain the requisite positional data. Also, when a manual theodolite is utilized, once the positional data associated with an object is obtained, the positional data is recorded manually. Data representative of attributes associated with the objects is also manually recorded. The positional data and the data representative of the attributes are thereafter entered into and stored in a computer database.

While positional data obtained through conventional surveying techniques is relatively accurate, conventional surveying techniques require technical expertise, are labor intensive, and are comparatively slow and expensive. Moreover, structured attribute entry of the data representative of the attributes together with the positional data is usually not possible, particularly when a manual theodolite is utilized. Several steps are required to store the data and the data is not stored in a manner to facilitate usage thereof by GIS software utilized to form a GIS database.

Positional data associated with the objects may also be obtained through the use of aerial photography. Aerial photographs taken of a geographical area may, however, include only those objects which are actually visible from the air. The aerial photograph may thereafter be digitized through the use of a computer scanner and entered into a computer database. Positional data associated with the objects visible in the aerial photograph relative to the overall geographical area may thereafter be accurately ascertained. Data representative of attributes associated with the visible objects may then be separately entered into the computer database. GIS software then accesses the data to form the GIS database.

As previously described, while positional data associated with the objects visible in the aerial photograph are accurate relative to the geographical area encompassed by the aerial photograph, to be included in the GIS database, the object must necessarily be visible from the air. If viewing of the object in the aerial photograph is obstructed, such as by a tree or by a building, the object cannot be identified and data representative of attributes associated with it cannot be stored. Therefore, if data associated with the object is to be stored in the GIS database, the data must be obtained in another manner. Also, even if the object is visible from the air, attributes associated with the object frequently are not. Viewing of the object from a ground location is therefore oftentimes still necessary in order to determine the attributes associated with the object.

SAFCO (tm) Corporation of 6060 Northwest Highway, Chicago, Ill. 60631 markets a WALKABOUT PCS (tm) system having a GRIDPAD (tm) hand-held computer and a laser-ranging distance/bearing measurement instrument for in-building navigation. The measurement instrument generates positional information which is stored in the computer. The system monitors the signal strengths of radio frequency signals, such as those generated in a cellular communication system. When positioned at a desired location, the signal strengths of radio frequency signals are measured and provided to the hand-held computer. The system does not provide for determination of positional data associated with remotely positioned objects and for entry of data associated with the remotely-positioned objects.

U.S. Pat. No. 5,214,757 ("'757") describes a system in which positional data associated with an object is obtained through the use of a Global Positioning System ("GPS") receiver operative in conjunction with the GPS satellites of the Global Positioning System. As therein described, the GPS receiver is coupled directly to a GPS computer, and the GPS receiver together with the GPS computer is positioned immediately proximate to a selected object as to which data is to be stored. Once positional data associated with the object is ascertained by the GPS receiver, the data is supplied directly to the GPS computer. The GPS computer, in turn, is coupled to a GIS computer which receives the data processed by the GPS computer. GIS software embodied in the GIS computer is operative to convert the stored data into a GIS database. When the GPS receiver is mounted on a motorized vehicle, the path of a roadway, for instance, may be plotted as the motorized vehicle travels along the roadway.

The GPS receiver is operative to provide accurate positional data relating to the location of the GPS receiver when positioned to receive signals generated by the GPS satellites of the global positioning system. However, if the GPS receiver is positioned at a location where signals from the GPS satellites are occluded, such as in a wooded or mountainous area, the GPS receiver cannot receive the positional signals generated by the GPS satellites. Under these conditions, the GPS receiver is simply not operational for generating accurate positional data for subsequent processing by the GPS computer. Moreover, in addition to those situations in which the operation of the GPS receiver is precluded by the immediate proximity of trees or mountains, positioning the GPS receiver adjacent to buildings in certain urban environments presents the same problems when buildings are of such a height to occlude portions of the sky. And, because the GPS receiver must be positioned immediately proximate to each selected object, a large amount of time is required to obtain the necessary positional data when positional data is to be obtained for large numbers of objects.

As previously noted, the system described in the '757 patent requires the GPS receiver to be positioned immediately proximate to each object as to which data is to be stored. In addition to the possible occlusion of the requisite GPS satellites, when data must be obtained for a large number of objects, the need to position the GPS receiver immediately proximate to each of the objects requires a significant amount of time and effort. As a result, the system described in the '757 patent may be inconvenient to utilize in determining the positional information of a relatively large number of features and, depending on the surrounding terrain, it may actually not permit the necessary positional data to form a GIS database to be obtained.

In light of the foregoing, it can be seen that existing techniques by which data may be collected all suffer from various disadvantages. It is with respect to these considerations and other background information relative to the determination and storage of data utilized by GIS software to form a GIS database that the significant improvements of the present invention have evolved.

SUMMARY OF THE INVENTION

The present invention advantageously provides a system and method utilizing a portable data acquisition device. The data acquisition device comprises, for example, a laser surveying instrument and an associated data collector. The data acquisition device determines and stores positional data associated with an object relative to a remotely located measuring position. A system and method of the present invention converts the positional data stored in the data acquisition device into absolute positional coordinates. The coordinates may be expressed, for example, in latitude, longitude, or easting/northing values in a common projection such as UTM, or some local coordinate system. The coordinates may alternatively be expressed as XY (two-dimensional), XYZ (three-dimensional) coordinates or other types of coordinates.

The data acquisition device can be carried by an operator to a position within a line of sight of selected objects. The position at which the portable data acquisition device is positioned defines a measuring position. The data acquisition device is utilized to determine position vectors between the measuring position and the selected objects and stores positional data of the selected objects defined by the position vectors in the data acquisition device. At least one of the selected objects or the measuring position itself may be located at a position having known, or ascertainable, absolute positional coordinates. The position having known, or ascertainable, absolute positional coordinates is referred to as a reference position. The data acquisition device also determines a position vector between the device and the selected object defining the reference position when a selected object defines the reference position. Data comprising values corresponding to the values of the position vectors forms positional data which is stored in the portable data acquisition device.

The portable data acquisition device further permits structured entry of data representative of attributes associated with the selected objects when the positional data associated with the features is stored. Once the positional data associated with the selected objects and the data representative of the attributes associated with the selected objects are stored in the portable data acquisition device, it can be taken from the measuring position and connected to processing circuitry, such as an office computer, to transfer the data stored in the portable data acquisition device to the processing circuitry. The processing circuitry includes appropriate software to convert the positional data transferred from the portable data acquisition device into absolute positional coordinates. The absolute positional coordinates, together with the data representative of the attributes, are converted into a form to facilitate usage of the data by GIS software to construct a GIS database.

In one embodiment of the present invention, the portable data acquisition device is used in conjunction with a GPS receiver. The GPS receiver is operative to determine absolute geographic positional coordinates of the location at which the GPS receiver is located. The position of the GPS receiver defines the reference position. In other embodiments, a survey marker or other object having known coordinates is utilized to define the reference position.

Because absolute positional coordinates of any selected object within sight of the portable data acquisition device can be determined through operation of the system and method of the present invention, a GPS receiving device need not be positioned directly proximate to the selected object. Therefore, absolute positional coordinates of the selected objects may be obtained even when a GPS receiver cannot be positioned proximate to the selected object and the problems associated with obtaining the absolute positional coordinates of the selected object are avoided when the sky above the GPS receiver is occluded.

In accordance with the present invention, therefore, a portable data acquisition device, including a position-determining device and a data collector, determines and stores positional data associated with selected objects and stores data representative of attributes associated with selected objects. The position-determining device determines position vectors between the measurement position of the position-determining device and selected objects wherein at least one of the selected objects or the position-determining device itself is located at a reference position. The position-determining device generates signals indicative of position vectors determined therebetween. A user interface operably responsive to actuation thereof by a user generates attribute descriptor signals representative of attributes associated with the selected objects. A storage device is coupled to the position-determining device and to the user interface for storing values of the signals generated by the position-determining device and the attribute descriptor signals in a desired format.

In a further embodiment of the present invention, the portable data acquisition device forms a portion of a system which determines absolute positional coordinates of selected objects positioned within a geographic area. The system further includes processing circuitry which may be coupled to the portable storage device to permit the data stored in the portable storage device to be transferred to the processing circuitry such that the data transferred thereto may be processed to determine the absolute positional coordinates of the selected objects.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
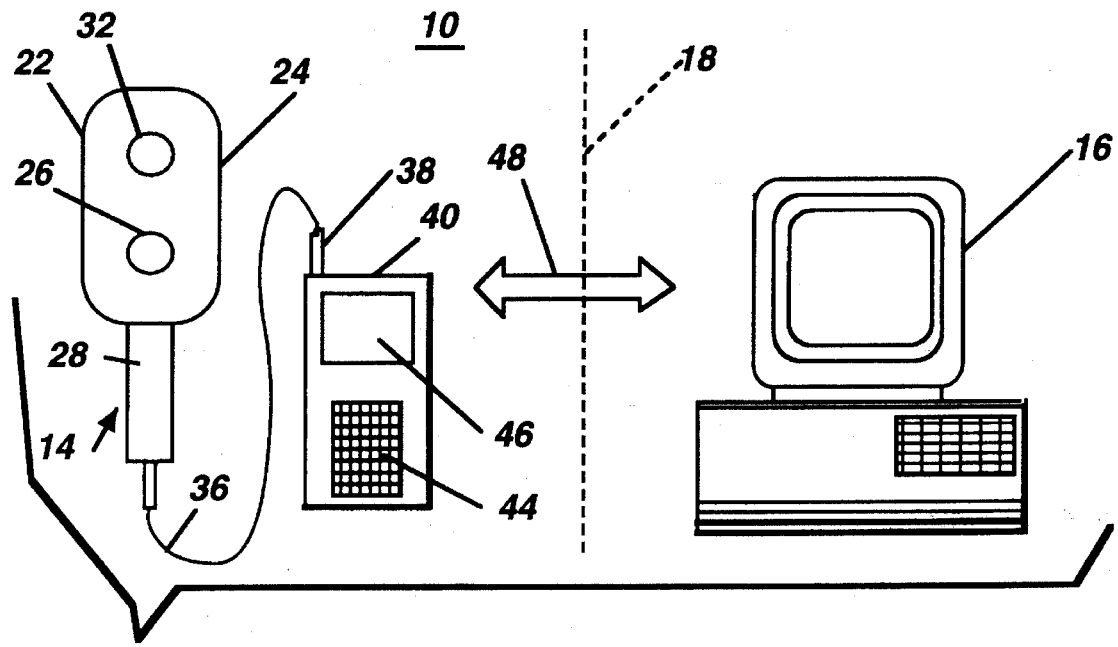
FIG. 1 is a partial schematic, partial block diagram of the system of an embodiment of the present invention.

FIG. 1 illustrates the system, shown generally as system 10, of an embodiment of the present invention. The system permits determination and storage of data which is utilized to create a geographic information system (GIS) database. The system 10 includes a portable data acquisition device 14 and processing circuitry, here an office computer 16. The portable data acquisition device 14 is field-operable, independent of any connection to the computer 16, and is of dimensions to permit carriage of the device 14 by a user-to a field location. The portable data acquisition device 14 includes the elements illustrated at the left-hand side (as shown) of the line 18, shown in dash.

The portable data acquisition device 14 includes a light generative device, here a commercially-available, laser survey instrument 22, such as a Criterion 400 (tm) laser survey instrument manufactured by Laser Technology, Inc., 7070 South Tucson Way, Englewood, Colo. 80112. The laser survey instrument 22 includes sensors housed within a housing 24 formed of a metal case and is of dimensions of approximately 3.6×6.5×8.5 inches and is of a weight of approximately six pounds.

The sensors supported at the housing 24 of the laser survey instrument 22 include an infrared laser diode 26 which determines ranges between the diode 26 and a remotely positioned object. The diode 26 has operative characteristics permitting the measurement of the range to a non-reflected feature, such as a tree or a building, located at a distance of up to five hundred meters from the diode 26. Use of a reflective prism (not shown) positioned at a selected object would permit the measurement range of the laser survey instrument 22 to be increased to more than nine kilometers with a range accuracy of ±0.3 feet (±9.4 centimeters).

While not illustrated in the figure, a damped resistive fluid-type tilt sensor is also housed within the housing 24 of the laser survey instrument 22. The tilt sensor is operative to measure the vertical angle of the laser survey instrument 22 relative to the remotely positioned object. The accuracy of the tilt sensor is ±0.2 degrees.

A flux gate compass (not shown) is also housed within the housing 24 of the laser survey instrument 22. The flux gate compass is operative to measure the horizontal angle of the laser survey instrument 22 with respect to magnetic north and exhibits an accuracy of ±0.3 degrees. The horizontal angle between the laser survey instrument 22 and the remotely positioned object can, in turn, be determined.

A hand-hold 28 forming a pistol grip extends beneath the housing 24 to facilitate gripping of the laser survey instrument 22 by a user. A telescopic sight 32 is also mounted at a top portion of the housing 24 to facilitate aiming of the laser survey instrument 22 by the user. The laser survey instrument 22 further includes a control panel and a display element to facilitate operation of the laser survey instrument 22 by the user.

A cable 36 extends between the laser survey instrument 22 and an RS-232 input port 38 of a hand-held data collector 40. The data collector 40 may be conveniently furnished as a MC5 (tm) data logger marketed by Corvallis Microtechnology. Signals generated during operation of the laser survey instrument 22 are transferred via the cable 36 to the data collector 40.

The laser survey instrument 22 is operative to determine the location of a selected object relative to the survey instrument 22 in terms of a range value, an azimuth value, and a vertical (or inclination) value. To obtain data, a user of the data acquisition device 14 carries, or otherwise transports, the device 14 to a field location within sight of the selected objects and aims the laser survey instrument 22 at the selected objects.

When operating the laser survey instrument 22, the user grips the gun 22 by way of the hand-hold 28 and sights the selected object through the sight 32. The user actuates a trigger actuator of the laser survey instrument 22 to cause the laser diode 26 to generate a signal in the direction of the selected object. Once the signal is generated by the diode 26, the laser survey instrument 22 determines the horizontal distance (i.e., the range), the true azimuth, and the vertical angle to the selected object. The horizontal distance is computed using signals generated by the laser diode 26 and the tilt sensor located within the housing 24, and the true azimuth is computed responsive to signals representative of the horizontal angle generated by the flux gate compass housed within the housing 24 and a user-entered value of declination. The survey instrument 22 also determines the value of a vertical angle.

The range, azimuth, and vertical angle are displayed upon the display element of the laser survey instrument 22 and signals representative of the range, azimuth, and vertical angle are transmitted via the cable 36 to the data collector 40 by way of the input port 38 thereof.

Signals applied to the input port 38 of the data collector 40 are stored in storage circuitry of the data collector 40. The storage circuitry of the data collector is formed of electronic memory elements and the memory elements are accessible by way of an internal processor, in a conventional manner. The data collector 40 also includes an actuation keypad 44 which, when selected keys of the keypad 44 are actuated by the user, generate input signals, the values of which are also stored in the storage circuitry. By associating particular attributes of an object with particular actuation keys, the user can input the particular attributes associated with the selected objects, as described.

To minimize the number of actuation keys required to be actuated by a user to identify particular attributes, as well as to provide a structured attribute entry system to the data collector 40, appropriate software is executable by the internal processor of the data collector 40 to cause generation of prompts on a display element 46 and to interpret properly the signals generated by actuation of the actuation keys of the keypad 44. In one embodiment of the present invention, the display element 46 is of characteristics to permit display of a pre-existing map thereupon. In this embodiment, the display element can be operable to form a portion of a data input system which allows for data input using a pointing device such as a mouse or electronic pen. The actuation keys of the actuation keypad may also be formed on the display element, actuatable by the pointing device.

When the portable data acquisition device 14 is utilized to obtain positional data associated with selected objects, a user carries the laser survey instrument 22 and the data collector 40 to a position within sight of the selected objects which are within the operable range of the laser survey instrument 22. By aiming the laser survey instrument 22 at the selected objects and triggering the laser survey instrument 22, positional data associated with the selected objects are stored in the data collector 40. Data representative of attributes associated with the selected objects input by a user of the data acquisition device 14 are also stored in the data collector 40 by appropriate actuation of the actuation keys of the keypad 44. As long as one of the selected objects or the data acquisition device 14 is positioned at a position having absolute positional coordinates which are either known or are ascertainable, the absolute positional coordinates of all of the selected objects can be later determined by appropriate processing techniques. The object positioned at a position having the known or ascertainable, absolute positional coordinates shall hereinafter be referred to as a reference position. The reference position is sometimes alternately referred to as an origin.

Once the positional data associated with the selected objects as well as appropriate attributes associated with the selected objects are stored in the data collector 40, the data collector 40 can be returned from the field location and coupled to the processing circuitry of the office computer 16 by way of a data bus 48. In one embodiment of the present invention, the data bus 48 is formed of hard-wired connections between the data collector 40 and the processing circuitry 16. The data bus 48 may, of course, comprise other means which permit data to be transferred between the data collector 40 and the processing circuitry 16 such as, for example, connection of both the data collector 40 and the processing circuitry 16 to appropriate wireless or telephonic communication devices.

Once the data collector 40 and the processing circuitry of the computer 16 are suitably coupled together by way of the data bus 48, data stored in the storage circuitry of the data collector 40 is transferred to the processing circuitry of the computer 16. The processing circuitry of the computer 16 performs post-processing calculations and converts the positional data stored in the data collector 40 into absolute positional coordinates of the selected object. The absolute positional coordinates, together with the data representative of the attributes associated with the selected objects are converted into a form to facilitate usage by GIS software to form a GIS database. The GIS database can be utilized to provide data used in the formation of GIS maps and other cartographic instruments. Rudimentary editing functions may also be performed by the computer. The computer 16 may be conveniently furnished as an IBM or IBM-compatible personal computer and the software for constructing the GIS database is available as, e.g., Autocad (tm), ArcInfo (tm), software or the like.

The processing circuitry of the computer 16 further includes software which forms a data dictionary which can be transferred from the processing circuitry 16 to the data collector 40 by way of the data bus 48 to store the data dictionary in the data collector 40 prior to field operation of the portable data acquisition device 14. The software forming the data dictionary allows a user to specify a list of objects (i.e., features) and attributes associated with the features that are relevant to a particular project and is similar to a database definition or schema. The data dictionary allows the program to present to a user an interface specific to a particular task. The data dictionary facilitates storing of the data representative of the attributes entered by a user through actuation of keys of the keypad 44. For instance, the data dictionary can provide prompts to be displayed upon the display element 46 of the data collector 40 to prompt a user of the acquisition device 14 to actuate particular keys of the keypad 44 which cause generation of attribute descriptor signals of values which form the data representative of attributes associated with selected objects.

Figure 2:
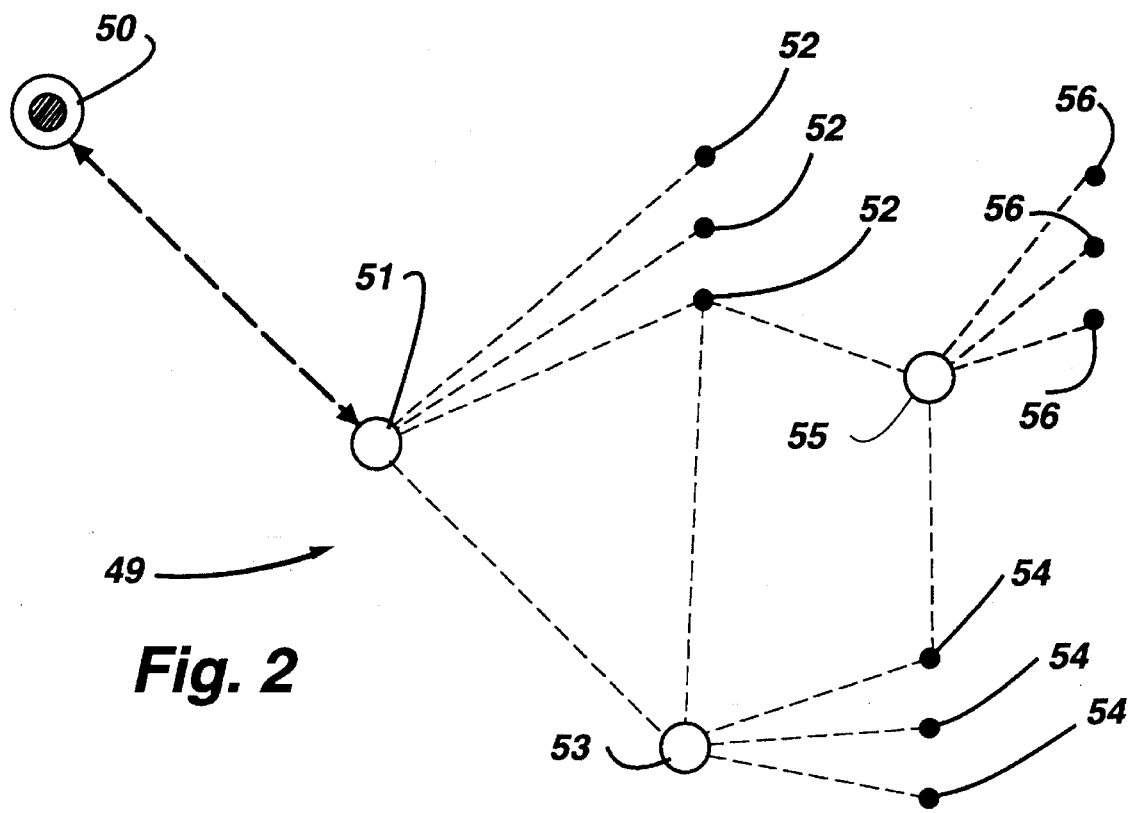
FIG. 2 is a plot illustrating manners in which a portable data acquisition device of an embodiment of the present invention may be utilized to obtain positional data.

FIG. 2 illustrates the flexibility permitted by the use of the portable data acquisition device 14 to obtain positional data of selected objects. A user of the acquisition device 14 (shown in FIG. 1) positioned within a geographical area, shown generally at 49, identifies a reference position 50. The absolute coordinates of the reference position 50 are either known or are ascertainable. That is to say, the absolute coordinates are either available to the user of the acquisition device 14 to permit the user to store the coordinates of the reference position 50 in the data collector 40 or the user can identify the reference position 50 to be a reference position, and the absolute coordinates of the reference position 50 may be later input or otherwise ascertained during subsequent processing of the data collected through operation of the acquisition device 14.

The user of the acquisition device 14 may initially be positioned either at the reference position 50, and then determine a position vector between the reference position 50 and a first measuring position 51. The position vector includes both distance and direction information to form a vector quantity. Alternately, the user may initially be positioned at the first measuring position 51 and then aim and trigger the survey instrument 22 of the acquisition device 14 back to the reference position 50, similarly to determine a position vector between the measuring position 51 and the reference position 50.

The user of the data acquisition device 14 then may aim and trigger the survey instrument 22 of the device 14 to determine position vectors between the first measuring position 51 and selected objects, here objects 52. The user may then enter attributes associated with the objects 52.

The user of the data acquisition device 14 may thereafter be positioned at another measuring position, here second measuring position 53, and determine the position of the second measuring position 53 by aiming and triggering the survey instrument 22 of the data acquisition device 14 back to the reference position 50, back to the first measuring position 51, or back to a selected object 52. Also, when still positioned at the first measuring position 51, the user may determine a position vector between the first measuring position 51 and the second measuring position 53. In this manner, the second measuring position 53 may be either directly related back to the reference position 50 or indirectly related back to the reference position 50.

Once positioned at the second measuring position 53, the user of the data acquisition device 14 may then determine position vectors between the second measuring position 53 and additional selected objects, here selected objects 54. The user of the data acquisition device 14 may then enter attributes associated with the objects 54.

In similar fashion, the user of the portable data acquisition device 14 may thereafter be positioned at a succeeding measuring position, here third measuring position 55. Relative positional coordinates of the measuring position 55 may be obtained by aiming and triggering the survey instrument 22 of the device 14 to the measuring position 55 when the user is positioned at one of the other measuring positions 51 or 53, or, once the user is positioned at the measuring position 55, by aiming and triggering the survey instrument 22 of the device 14 back to one of the measuring positions 51 or 53, or one of the selected objects 52 or 54. The measuring position 55 need not be related directly back to the reference position 50; rather, the measuring position 55 need only be indirectly related back to the reference position 50.

Once positioned at the measuring position 55, positional vectors between the measuring position 55 and the selected objects 56, may also be determined. The user of the device 14 may thereafter be positioned at additional measuring positions to determine positional vectors between the additional measuring positions and additional selected objects, as desired.

The illustration of FIG. 2 illustrates the flexibility permitted of the user when establishing measuring positions and recording positions and attributes of objects. If convenient to the user, positional vectors can be obtained between the reference position 50 and selected objects and separate measuring positions need not be established. Or, multiple numbers of measuring positions, such as measuring positions 51, 53 and 55 may be defined, either before or after the user is positioned at the measuring positions. The user need only identify the reference position 50 and thereafter aim and trigger the survey instrument 22 of the data acquisition device 14 at the selected objects. Absolute coordinates of the measuring positions and selected objects are later determined by execution of appropriate software in the computer 16.

Figure 3:
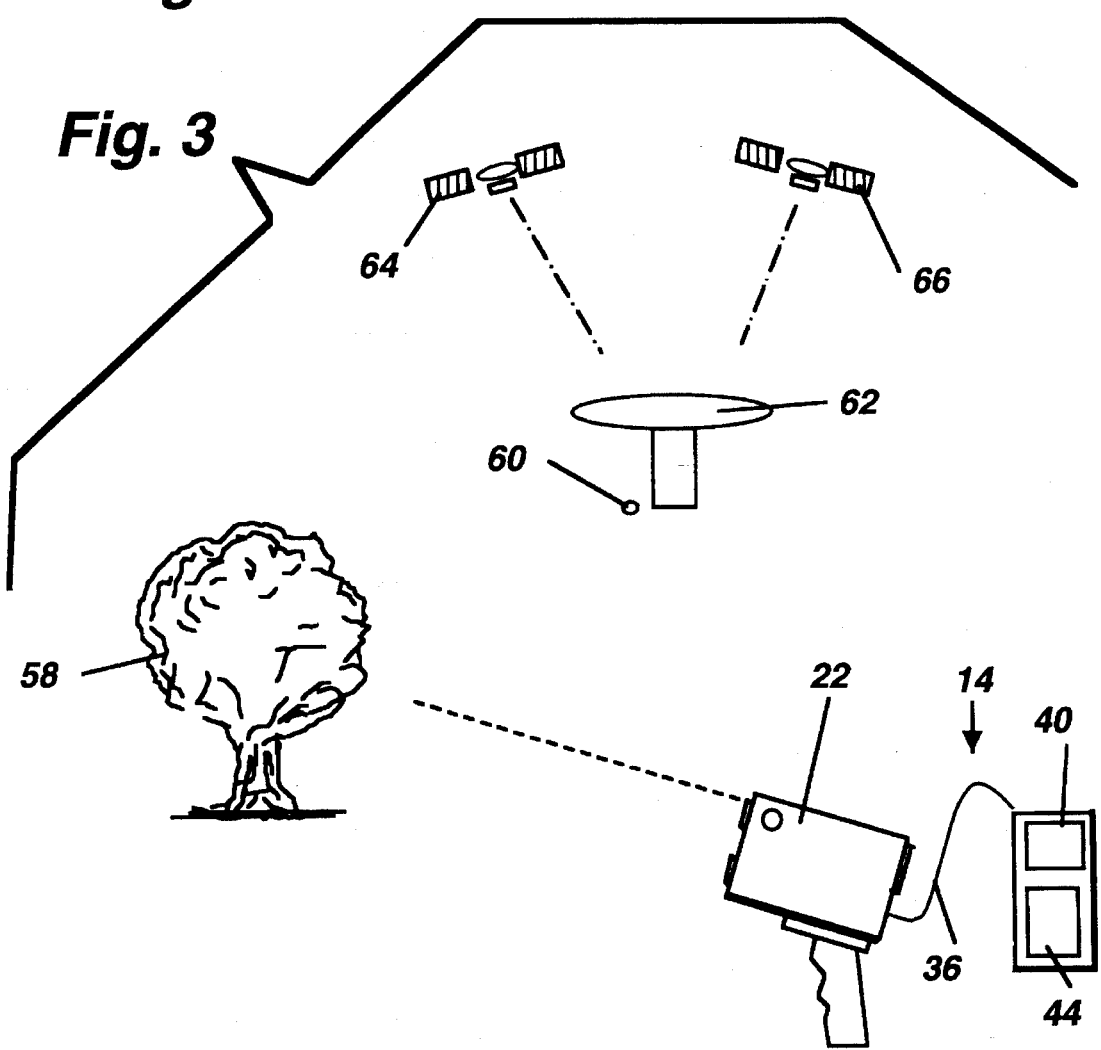
FIG. 3 is a partial schematic, partial block diagram of a portable data acquisition device positioned to obtain and store positional data associated with a selected object.

FIG. 3 illustrates a particular example by which the portable data acquisition device may be utilized to obtain data. Here, the portable data acquisition device 14 is positioned at a measuring position to determine positional data associated with a selected object, here a tree 58. The portable data acquisition device 14 is positioned within sight of the tree 58 and also a feature which defines a reference position 60. The data acquisition device 14 may be positioned at any position within sight of the tree 58 and the reference position 60.as long as the distances separating the acquisition device 14 and the reference position 60 and the acquisition device 14 and the tree 58 are within the operable range of the laser survey instrument 22.

In the illustration of the figure, the reference position 60 is defined by the positioning of a GPS receiver 62 operative in conjunction with GPS satellites, here satellites 64 and 66, of the Global Positioning System. The GPS receiver 62 is operable to determine the absolute positional coordinates thereof and, hence, also of the reference position. The GPS receiver typically determines the absolute positional coordinates in terms of values of latitude, longitude, and altitude. In other embodiments, the reference position 60 is defined by a surveying marker or other marker of which the absolute positional coordinates thereof are known or can be ascertained.

The user of the portable data acquisition device 14 first opens a data file at the data collector 40 by actuation of appropriate keys of the keypad 44. Data stored during a particular field recording operation is stored in a particular data file. If known, data associated with the absolute positional coordinates of the reference position can also be stored in the memory element which forms the storage circuitry of the data collector 40. Otherwise, the absolute positional coordinates of the reference position can be input during subsequent processing of the data by the processing circuitry of the computer 16. The user of the portable data acquisition device 14 then aims and triggers the laser survey instrument 22 at the reference position 60 to determine the position vector between the data acquisition device 14 and the reference position 60. The position vector includes both distance and direction information to form a vector quantity. Signals representative of the position vector are supplied to the data collector 40 via the cable 36. Values of the signals supplied to the data collector form positional data which is stored in the memory element of the data collector 40 of the device 14.

The user of the data acquisition device 14 thereafter aims and triggers the laser survey instrument 22 at the tree 58. The range, azimuth, and vertical angle values which define the position vector separating the data acquisition device 14 and the tree 58 are determined by the laser survey instrument 22 and signals representative of the position vector are supplied to the data collector 40 over the cable 36. Values of the signals supplied to the data collector form positional data which is stored in the data collector 40. Data representative of the attributes of the tree 58 may be stored in the data collector by appropriate actuation of the actuation keys of the keypad 44 by the user of the device 14.

Positional data associated with other objects may similarly be obtained and recorded by the device 14. Data representative of attributes associated with the additional objects may also be recorded by the data collector 40 upon appropriate actuation of the actuation keys of the actuation keypad 44. Once the desired data is stored in the data collector 40, the data collector 40 can be removed from the measuring position and thereafter be connected to the processing circuitry of the computer 16 by way of the data bus 50. The data stored in the data collector 40 is then transferred to the processing circuitry of the computer 16.

Because the absolute positional coordinates of the reference position 60 are known, as well as the position vectors between the measuring position and the reference position 60 and between the tree 58 and the measuring position, the absolute positional coordinates of the tree 58 can be determined.

The processing circuitry of the computer 16 converts the positional data stored relating to the position of the tree 58 into absolute positional coordinates, and places the data, including the data representative of the attributes associated with the objects, in a form to facilitate use thereof by GIS software.

Figure 4:
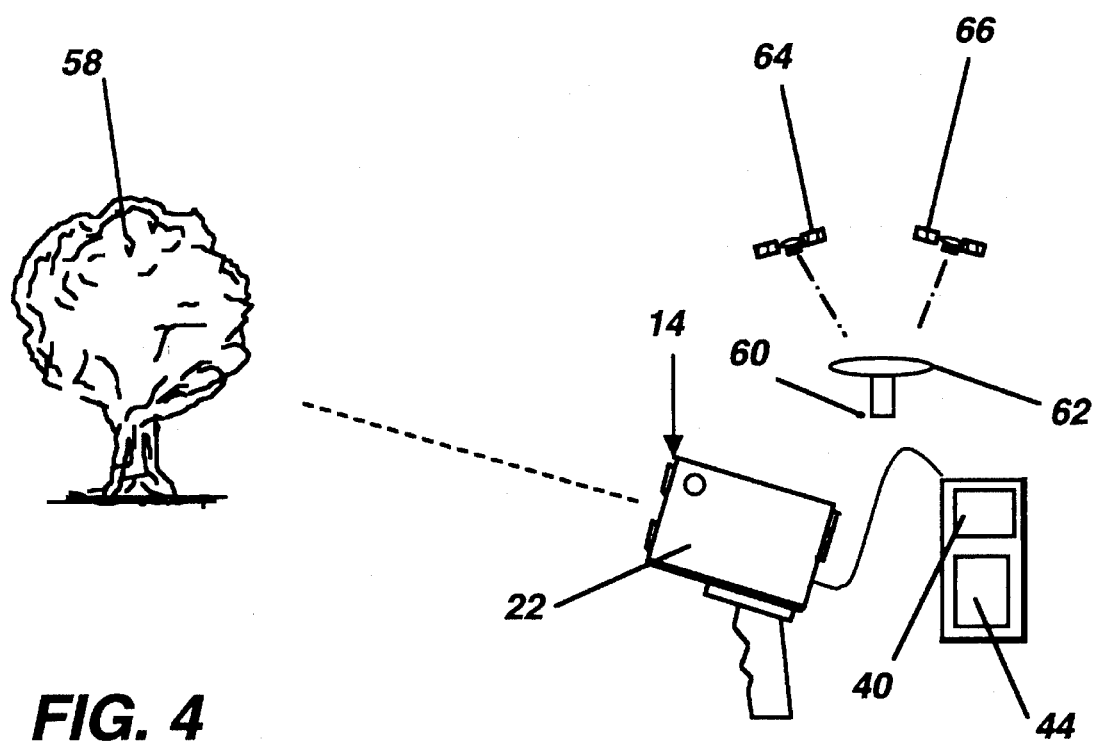
FIG. 4 is a partial schematic, partial block diagram, similar to that of FIG. 3, but wherein the portable data acquisition device is positioned proximate to the GPS receiver, again to obtain and to store positional data, and data representative of attributes, associated with a selected object.

FIG. 4 illustrates another example of the portable data acquisition device 14 in place at a measuring position to measure and store positional data associated with a selected object, here again a tree 58. In the illustration of FIG. 4, the portable data acquisition device 14 is positioned at a position having known absolute positional coordinates associated therewith to define reference position 60. A GPS receiver 62 operative in the Global Positioning System (including GPS satellites 64 and 66) defines the reference position 60. The GPS receiver 62 is again operable to determine the absolute positional coordinates thereof and also of the reference position 60. Here, both the reference position and the measuring position have identical absolute positional coordinates. By storing data in the data collector 40 associated with the absolute positional coordinates of the reference position 60, the absolute positional coordinates of the measuring position at which the device 14 is also positioned are also stored.

The user of the portable data acquisition device 14 first opens a data file at the data collector 40 by actuation of appropriate keys of the keypad 44. Data stored during the field recording operation is stored in a particular data file. Data associated with the absolute positional coordinates of the reference position 60 may be stored in the memory elements of the data collector 40. Otherwise, the absolute positional coordinates of the reference position can be input and stored during subsequent processing of the data by the processing circuitry of the computer 16. This data then also defines the absolute positional coordinates of the measuring position at which the data acquisition device 14 is positioned.

By aiming and triggering the laser survey instrument 22 at the tree 58, or other selected object, the range, azimuth, and vertical angle values which define the position vector between the device 14 and the tree 58, or other selected object, are determined. Signals representative of the position vector are supplied to the data collector 40 by means of the cable 36. Values of the signals supplied to the data collector 40 form positional data which is stored in the data collector 40.

Data representative of attributes associated with the tree 58 may again be stored in the data collector 40 by actuation of the appropriate keys of the actuation keypad 44 of the data collector 40. Positional data and data representative of attributes of other selected objects may similarly be obtained and then stored in the storage circuitry of the data collector 40.

Once the positional data and data representative of the attributes is stored, the data collector 40 can be removed from the measuring position and thereafter be connected to the processing circuitry of the computer 16 by way of the data bus 50. At this point, the data stored in the data collector 40 is transferred to the processing circuitry of the computer 16. The positional data stored relating to the tree 58 into absolute positional coordinates. The data representative of the attributes and the absolute positional coordinates are stored in files which may be utilized by GIS software to form a GIS database of the data transferred thereto.

Figure 5A:
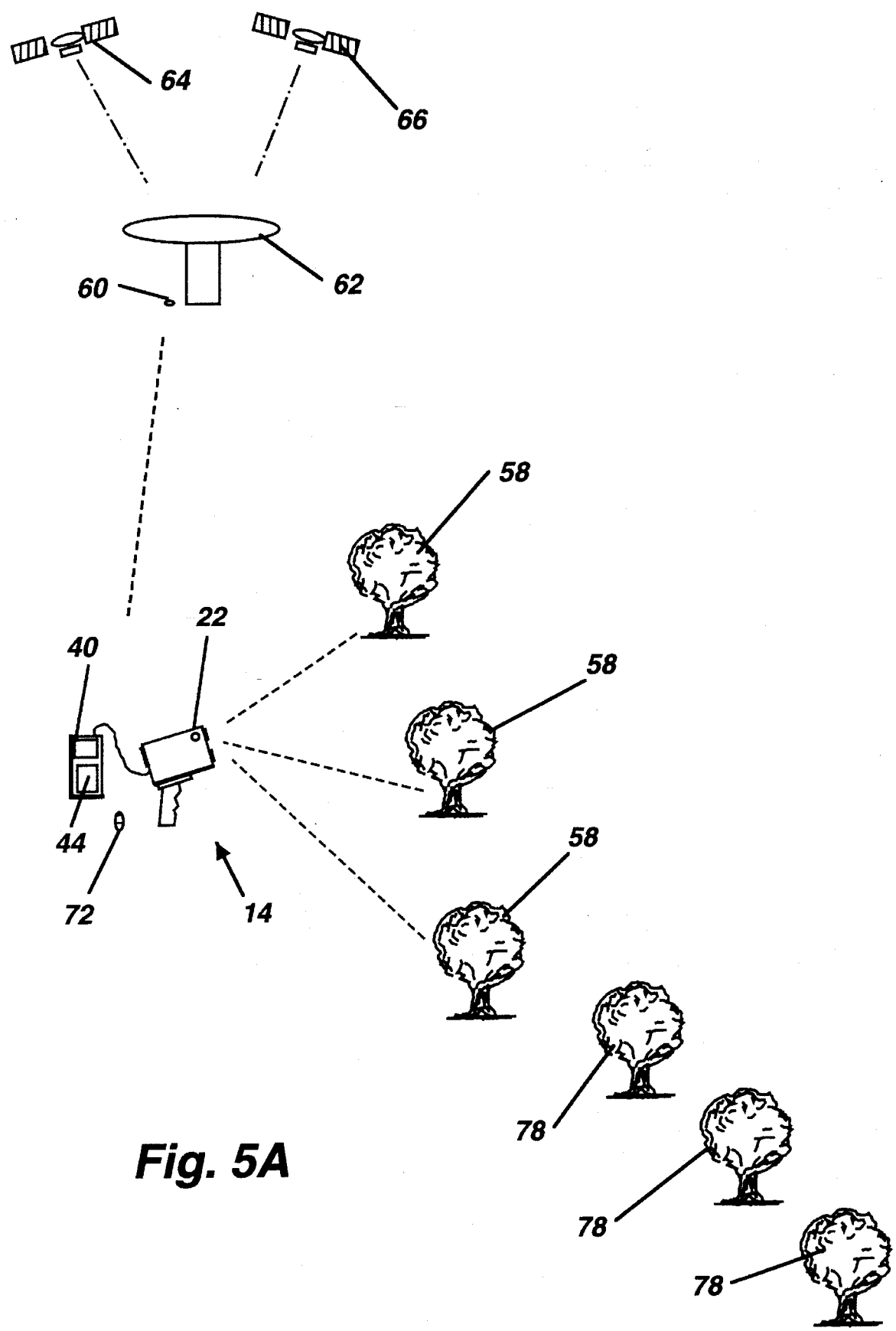
FIGS. 5A and 5B are partial schematic, partial block diagrams, similar to those of FIGS. 3 and 4, but illustrating the portable data acquisition device sequentially positioned at two separate measuring positions to obtain and to store positional data, and data representative of attributes, associated with several selected objects.
Figure 5B:
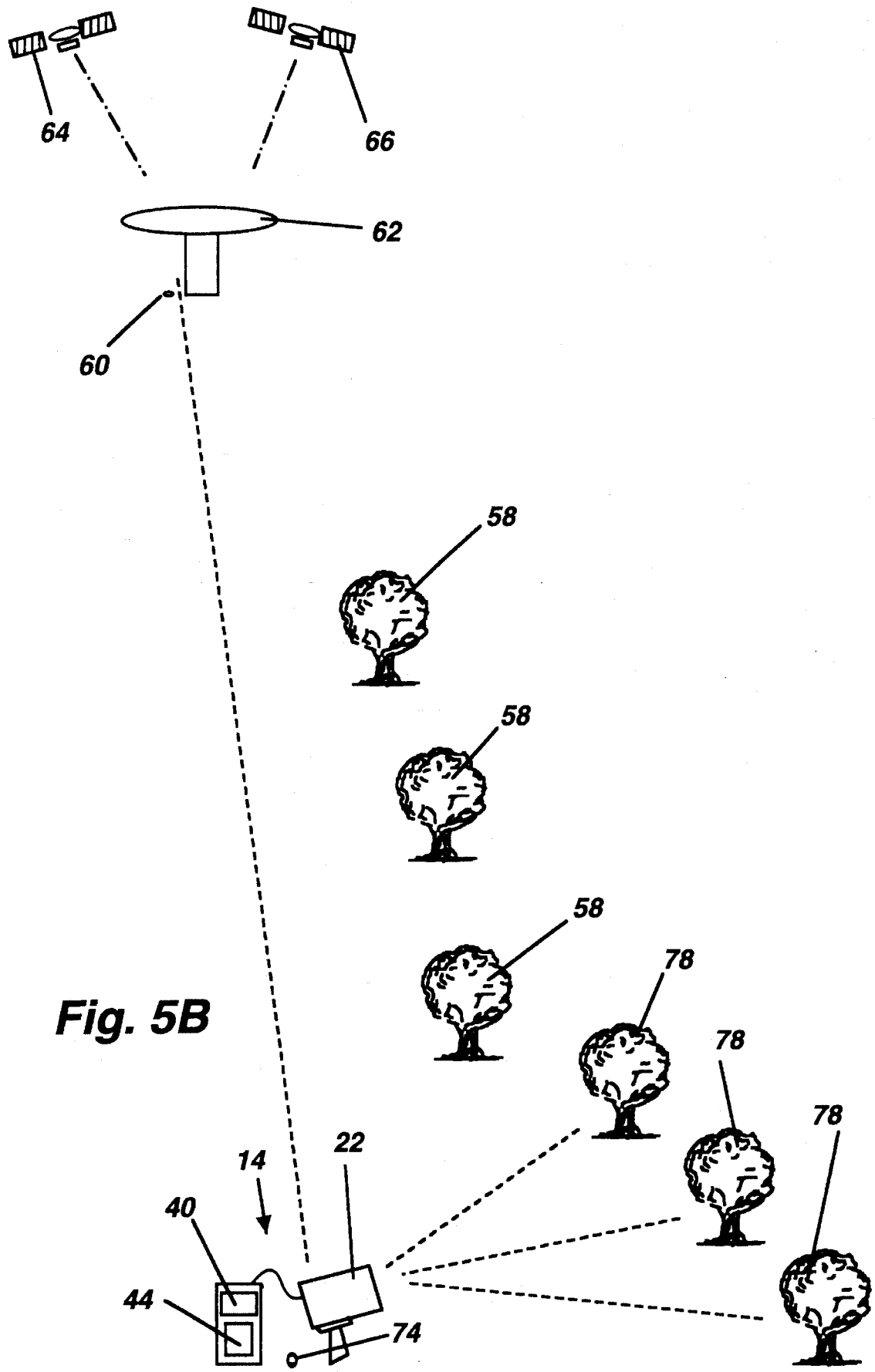

In FIGS. 5A and 5B, the portable data acquisition device 14 is sequentially positioned at two separate measuring positions 72 and 74 to obtain positional data associated with selected objects within sight of the laser survey instrument 22. Again, a GPS receiver 62 operative in a global positioning system having GPS satellites 64 and 66 is used to obtain absolute positional coordinates and define a reference position 60. If known, data associated with the absolute positional coordinates of the GPS receiver 62 and, hence, the reference position 60 are stored in the data collector 40, such as through manual entry of the positional coordinates by way of the actuation keys of the keypad 44. Otherwise, the absolute positional coordinates of the reference position can be input and stored during subsequent processing of the data by the processing circuitry of the computer 16.

Thereafter, the data acquisition device 14 is positioned by the user at the measuring position 72, and the laser survey instrument 22 of the device 14 is aimed at and triggered at the reference position 60 to determine the position vector separating the positions 60 and 72. Range, azimuth, and vertical angle values of the measured position vector are determined, and signals representative of the position vector are supplied to the data collector 40 by way of the cable 36. Values of the signals supplied to the data collector form positional data which is stored in the memory elements of the data collector 40 of the device 14.

The laser survey instrument 22 is then aimed and triggered at selected objects, here again trees 58, to determine the position vectors between the trees 58 and the measuring position 72. Data representative of attributes associated with the trees 58 are also stored in the data collector 40 by way of the actuation of selected keys of the actuation keypad 44.

Additional objects, here represented by trees 78, are positioned behind the trees 58 in the figure, and, when the data acquisition device 14 is positioned at the measuring position 72, the trees 78 are not within the sight of the laser survey instrument 22 of the device 14. In order to obtain positional data associated with the trees 78, the data acquisition device 14 is repositioned at the measuring position 74, as illustrated in FIG. 5B. The user of the device 14, once the device 14 is positioned at the measuring position 74, aims and triggers the laser survey instrument 22 at the reference position 60, or at the first measuring position 72, if it is within sight of the survey instrument 22 of the device 14, and the range, azimuth, and vertical angle values of the position vector between the measuring and reference positions 74 and 60 are determined and form positional data which is stored in the data controller 40.

The laser survey instrument 22 is then aimed and triggered at the trees 78 to determine the respective position vectors between the measuring position 74 and the individual trees 78, and range, azimuth, and vertical angle values of the position vectors are determined again to form positional data which is stored in the memory element of the data collector 40. Data representative of attributes associated with individual ones of the trees 78 are also stored in the data collector 40 responsive to the actuation of selected actuation keys of the actuation keypad 44. Once positional data associated with the selected objects, here the trees 58 and 78 and the reference position 60, are stored within the data collector 40, the data acquisition device can be removed from the measuring position 74 and connected to processing circuitry of the computer 16 by way of the data bus 50 to transfer the data stored in the data collector 40 to the processing circuitry of the computer 16. The processing circuitry of the computer 16 converts the positional data of the trees 58 and 78 stored therein into absolute positional coordinates. The data representative of the attributes and the absolute positional coordinates are stored in files which may be utilized by GIS software to form a GIS database of the data transferred thereto.

Figure 6:
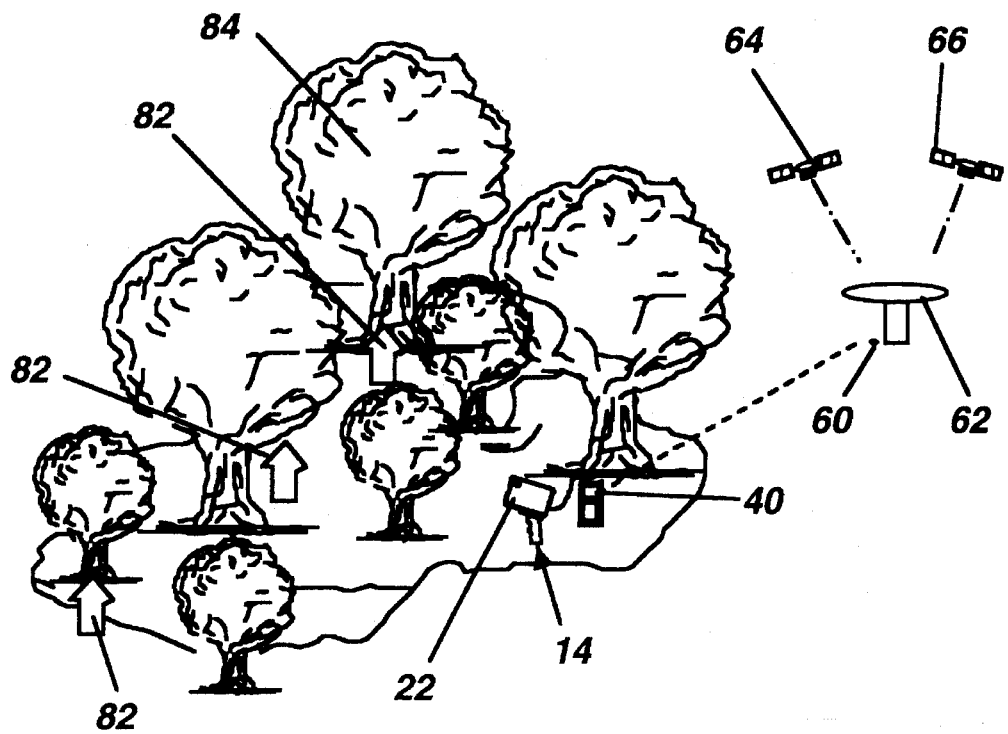
FIG. 6 is a schematic representation of example terrain at which selected objects may located and as to which positional data associated with each selected object may be obtained and stored, and data representative of attributes of each selected object may be stored, by the portable data acquisition device, thereafter to be converted into absolute positional locations by means of the system of the present invention shown in FIG. 1.

FIG. 6 illustrates another example of positioning of the portable data acquisition device 14 to determine and store positional data associated with selected objects, here identified by arrows 82. The data acquisition device 14 is positioned beneath a canopy of trees 84, but within sight of the selected objects identified by the arrows 82. A GPS receiver 62 is positioned beyond the canopy of trees 84 and the absolute positional coordinates of the GPS receiver defines a reference position 60. Because the GPS receiver 62 is positioned beyond the canopy of the trees 84, the receiver 62 is able to receive signals generated by the satellites 64 and 66 of a global positioning system to determine the absolute positional coordinates thereof.

The position of the portable data acquisition device 14 in FIG. 6 is analogous to the position of the data acquisition device 14 illustrated in FIG. 2. A user of the device 14 first aims and triggers the laser survey instrument 22 of the device 14 at the reference position 60, and thereafter aims and triggers the laser survey instrument 22 at the selected objects identified by the arrows 82. Even though the data acquisition device 14 is positioned at a location in which the part of the sky in which the GPS satellite is positioned is occluded, positional data associated with the selected objects may be obtained, data representative of the attributes of the objects may be stored, and absolute positional coordinates of the selected objects together may thereafter be determined by transferring the data stored in the data collector 40 of the device 14 to the computer by execution of software in the processing circuitry of the computer 16.

The software executable by the processing circuitry of the computer 16, when coupled by way of the data bus 50 to the data collector 40, permits the transfer of data files (inclusive of the transfer of data dictionaries and the transfer of the data stored in the data collector 40 during operation of the device 14) between the processing circuitry of the computer 16 and the data collector 40. Software executable by the processing circuitry of the computer 16 also enables the user to enter and store the absolute positional coordinates of the reference position of a data file if these coordinates were not previously stored in the field. Software executable by the processing circuitry of the computer 16 also determines absolute positional coordinates of the selected objects based upon the absolute positional coordinates of the reference position. Data representative of the attributes and the absolute positional coordinates are reformatted by the software and is then stored in files which may be utilized by GIS software to create a GIS database.

Additional software permits "batch mode" operation of the processing circuitry of the computer 16 to set reference coordinates in several field data files using a companion ASCII file or a GPS output file or a GIS database formatted in another manner. Execution of software permits visual displays of multiple, overlaid data files to be created, interactive graphical query and editing functions to be performed, and feature coordinates and attributes to be converted into other interchange file formats (e.g., arc/GEN. DXF. dBASE), and the absolute positional locations to be generated in coordinates in, for example, latitude/longitude or easting/northing values in common projections, such as UTM, or in some other local coordinate system. The absolute positional locations may alternately be expressed as XY (two-dimensional), XYZ (three-dimensional) coordinates, or other types or coordinates.

Figure 7:
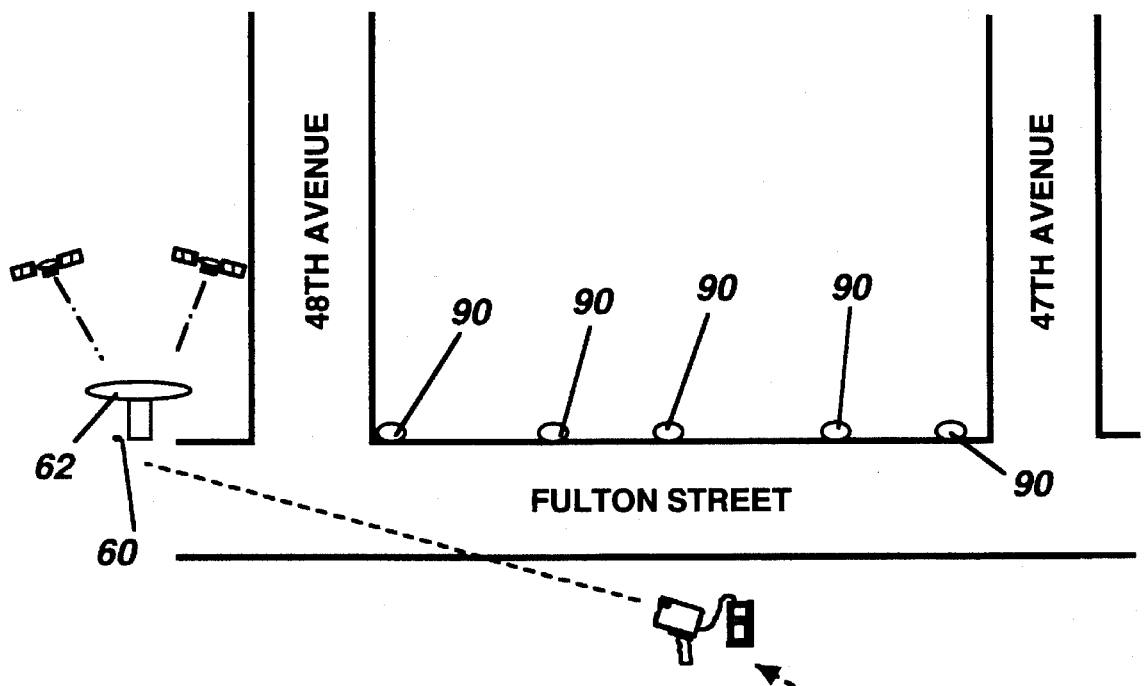
FIG. 7 is an illustration of a geographical area having a number of identified objects wherein absolute positional coordinates of the objects may be determined, and data representative of attributes of the objects may be recorded, through operation of the system illustrated in FIG. 1.

FIG. 7 represents an exemplary geographical area having selected objects, here telephone poles 90 wherein the absolute positional coordinates of the telephone poles 90 and attributes associated therewith can be obtained through operation of the system 10 of the embodiment of the present invention illustrated in FIG. 1. A GPS receiver 62 is positioned at the northwest corner of the intersection of 48th Avenue and Fulton Street illustrated in the figure, and the portable data acquisition device 14 is positioned along the south side of Fulton Street. A data file is opened. If known, data associated with the absolute positional coordinates determined by the GPS receiver may be stored in the data collector 40 of the device 14. Otherwise, the absolute positional coordinates of the reference position can be input and stored during subsequent processing of the data by the processing circuitry of the computer 16. The laser survey instrument 22 of the device 14 is aimed and triggered at the reference position 60. Positional data having values of the range, azimuth, and vertical angle values of the position vector between the device 14 and the reference position 60 are determined and stored in the memory elements of the data collector 40.

Thereafter, the laser survey instrument 22 of the device 14 is aimed and triggered at each of the telephone poles 90 located along Fulton Street, and data representative of the attributes associated with each one of the telephone poles 90 is entered through actuation of keys of the keypad 44 by the user of the device 14 to determine and store both positional data and attributes associated with each of the telephone poles 90. Thereafter, the data stored in the data collector 40 is transferred to the processing circuitry of the computer 16, and the processing circuitry 16 converts the data transferred thereto into absolute positional coordinates. The absolute positional data and the data representative of the attributes are stored in files which are utilized by GIS software to form a GIS database from which GIS maps or other cartographic instruments may be formed. A GIS map may, for example, be created to appear identical with the representation of FIG. 7; attributes associated with the features may also be overlaid upon the GIS map.

As mentioned previously, in one embodiment of the present invention, the display element 46 of the data collector 40 is of characteristics to permit the display of a pre-existing map and the display element 46 forms a portion of a data input system which allows for data input using a pointing device such as a "mouse" or electronic pen. The pre-existing map may, for example, be similar to the map shown in FIG. 7. With such a system, the user positions the portable data acquisition device 14 at a measuring position and selects an object to use as a reference position that is visible and within range of the survey instrument 22 of the device 14 and that is also represented by a symbol on the pre-existing map. The reference position is first identified by pointing to the symbol on the map with the pointing device, such as the aforementioned "mouse" or electronic pen. The coordinates of that symbol as stored in the file representing the pre-existing map are used as the absolute positional coordinates of the reference position. The survey instrument 22 of the data acquisition device 14 is then aimed at the object positioned at the reference position, and is then triggered. The data collector stores the position vector between the measuring position and the object positioned at the reference position. The survey instrument is then aimed at individual ones of the telephone poles 90, and is then triggered. The data collector stores the positional data associated with the telephone pole and attributes associated with the telephone pole may also be entered by the user, for example, through actuation of appropriate keys of the keypad 44. The telephone poles may then be caused to be displayed on the map, accurately positioned with respect to the reference position. Thus, merely by aiming and triggering the survey instrument at the telephone poles 90, positional data is obtained and the user is provided with a display of the measured position of the telephone pole.

The data acquisition device 14 can obtain the information necessary to form data files which facilitates use of the data by GIS software to form a GIS database without positioning the device 14 directly proximate to the objects. The device 14, and the system 10 including the device 14 is portable and is advantageously utilized to determine absolute positional coordinates associated with objects which may only be inconveniently accessed. Also, the device 14 need not be positioned directly proximate to a GPS receiver, and the device 14 is operable to determine and store data when positioned at locations in which a GPS receiver would be otherwise unable to determine accurate positional coordinates, such as when portions of the sky are occluded. Because data representative of attributes associated with the selected objects may be entered by a user of the device 14 together with positional data associated with the selected objects, convenient entry of data representative of the attributes is also permitted. The stored data can be thereafter utilized to form portions of a GIS database.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. A system for determining absolute positional coordinates of selected objects positioned within a geographic area, said system comprising:

a portable position-determining device for determining position vectors between said portable position-determining device and each of the selected objects wherein at least one of the selected objects for said portable position-determining device is located at a reference position having known positional coordinates associated therewith, said portable position-determining device further for generating signals indicative of the position vectors determined thereat;

said portable position-determining device being positioned proximate to a global positioning system receiver operative in a global positioning system to calculate absolute positional coordinates, and said portable position-determining device and the global positioning system receiver are together positioned at the reference position and the absolute positional coordinates form the known positional coordinates associated with the reference position;

a portable storage device coupled to said portable position-determining device, said portable storage device for storing data having values responsive to values of the signals generated by said portable position-determining device; and processing circuitry releasably coupled to the portable storage device to permit the data stored in said portable storage device to be transferred to said processing circuitry when said processing circuitry and said portable storage device are coupled together, said processing circuitry for processing the data transferred thereto to determine thereby the absolute positional coordinates of the selected objects.

2. The system of claim 1 further comprising a portable user interface operable responsive to actuation thereof by a user, said portable user interface for generating signals representative of attribute descriptors associated with the selected objects.

3. The system of claim 2 wherein said portable storage device is further coupled to said portable user interface and wherein said portable storage device further stores data having values responsive to values of the signals generated by said portable user interface.

4. The system of claim 3 wherein said portable interface comprises a manually actuatable keypad having actuation keys which, when actuated, generate the signals representative of the feature descriptors associated with the selected objects.

5. The system of claim 4 wherein said portable storage device comprises a data collector having electronic memory elements and an internal processor.

6. The system of claim 5 wherein said processing circuitry is further operative, when coupled to the portable data storage device, to transfer data including data forming software algorithms to said data collector wherein, once transferred to said data collector, said software algorithms are executable by the internal processor.

7. The system of claim 5 wherein the data collector forming said portable storage device further comprises an input port and wherein said portable position-determining device is coupled to the data collector by way of a connecting cable which is connected to the input port of the data collector and to the portable position-determining device wherein the signals generated by the portable position-determining device are transmitted along said connecting cable to be received at the input port of said portable storage device.

8. The system of claim 2 wherein said portable user interface comprises a pointing-device interface and a visual display element, said pointing-device interface positionable relative to the visual display element and actuatable by the user for generating the signals representative of the attribute descriptors associated with the selected objects.

9. The system of claim 1 wherein said portable position-determining device comprises a line-of-sight light generative device which determines the position vectors between said position-determining device and the selected objects in terms of range values and azimuth values.

10. The system of claim 1 wherein said processing circuitry is further operative to place the absolute positional data in files accessible by geographic information software for generating a geographic information system database which includes the absolute positional coordinates as portions thereof.

11. The system of claim 1 wherein said processing circuitry is further operative to generate visual displays of the data.

12. A portable, hand-held, line-of-sight, distance measuring device that is operable by a human at a given-location within a geographic area, said distance measuring device being operable to determine and to store object-position data for human-selected objects that are also within said geographic area, said human-selected objects being physically-spaced from said given-location, one of said human-selected objects being at a known reference position within said geographic area, and said distance measuring device being operable to enable human-manual-entry and storing of object-attribute data that is associated with at least certain ones of said human-selected objects, said portable distance measuring device comprising:

a human-controlled position-determining device utilizing laser radiation that is transmitted from said given-location to said physically-spaced locations, to thereby cause laser radiation to be reflected back to said position-determining device from each of said human-selected objects;

said position-determining device operating in response to said reflected laser radiation to determine object-position data relative to said position-determining device for each of said human-selected objects;

an interface including human-operable input means enabling entry of object-attribute data associated with said at least certain ones of said human-selected objects;

a storage device coupled to said position-determining device and to said interface, said storage device being operable to store said object-position data and said object-attribute data as non-GIS data;

computer processing means located remote from said geographic area for coupling to said storage device, said computer processing means operating to download said non-GIS data into said computer processing means; and means within said computer processing means for processing said downloaded non-GIS data to form a GIS data base.

13. The device of claim 12 wherein a GPS satellite system is viewable from said geographic area, wherein at least certain ones of said human-selected objects do not view said GPS satellite system, and including:

a GPS receiver positioned at said known reference position within said geographic area, said GPS receiver operating to establish said known reference position within said geographic area.

14. The device of claim 12 wherein a GPS satellite system is viewable from said geographic area, wherein at least certain ones of said human-selected objects do not view said GPS satellite system, including:

a GPS receiver positioned along with said portable position measuring system at said known reference position, said GPS receiver operating to establish said known reference position within said geographic area.

* * * * *